United States Patent
Brendel

(10) Patent No.: US 9,796,451 B2
(45) Date of Patent: *Oct. 24, 2017

(54) WAKE SHAPING SYSTEM FOR A BOAT

(71) Applicant: MB SPORTS, Atwater, CA (US)

(72) Inventor: Michael Hardy Brendel, Merced, CA (US)

(73) Assignee: MB Sports, Atwater, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/874,141

(22) Filed: Oct. 2, 2015

(65) Prior Publication Data

US 2016/0096590 A1   Apr. 7, 2016

Related U.S. Application Data

(63) Continuation of application No. 14/662,116, filed on Mar. 18, 2015, now Pat. No. 9,150,289, which is a continuation of application No. 14/506,039, filed on Oct. 3, 2014, now Pat. No. 9,038,560.

(51) Int. Cl.

| | |
|---|---|
| *B63B 1/32* | (2006.01) |
| *B63B 35/73* | (2006.01) |
| *B63B 35/85* | (2006.01) |
| *B63B 1/20* | (2006.01) |
| *B63B 39/06* | (2006.01) |

(52) U.S. Cl.
CPC ............ *B63B 1/32* (2013.01); *B63B 1/20* (2013.01); *B63B 35/73* (2013.01); *B63B 35/85* (2013.01); *B63B 39/061* (2013.01); *B63B 2035/855* (2013.01); *Y02T 70/12* (2013.01)

(58) Field of Classification Search
CPC .... B63B 1/20; B63B 1/22; B63B 1/28; B63B 1/286; B63B 1/32; B63B 35/73; B63B 35/85; B63B 2035/855; B63B 39/061
USPC ................ 114/284, 285, 286, 287
See application file for complete search history.

(56) References Cited

U.S. PATENT DOCUMENTS

| | | | |
|---|---|---|---|
| 3,200,782 A | 8/1965 | Walden et al. | |
| 4,577,580 A | 3/1986 | Diffely | |
| 6,941,884 B2 | 9/2005 | Moore | |
| 8,534,214 B1 | 9/2013 | Gasper | |
| 8,539,897 B1 | 9/2013 | Gasper et al. | |
| 8,578,873 B2 | 11/2013 | Gasper et al. | |
| 8,833,286 B1 | 9/2014 | Sheedy et al. | |
| 9,038,560 B1 * | 5/2015 | Brendel | B63B 35/73 114/284 |
| 9,067,644 B2 | 6/2015 | Sheedy et al. | |
| 9,150,289 B1 * | 10/2015 | Brendel | B63B 35/73 |
| 9,199,695 B2 | 12/2015 | Gasper et al. | |
| 9,260,161 B2 | 2/2016 | Gasper et al. | |

(Continued)

*Primary Examiner* — Lars A Olson

(74) *Attorney, Agent, or Firm* — Baker & McKenzie LLP

(57) ABSTRACT

A boat comprising a wake shaping system comprising starboard and port wake shaping devices located aft of the transom. Each wake shaping device is operable to move between a first, non-deployed position behind the transom and a second, deployed position extending outside the side of the hull or below the transom. When the starboard wake shaping device is in the deployed position, a port wakesurf wake is created. When the port of the wake shaping device is in the deployed position, a starboard wakesurf wake is created. When neither wake shaping device is deployed, a symmetrical wakeboard wake is created.

30 Claims, 11 Drawing Sheets

(56) References Cited

U.S. PATENT DOCUMENTS 9,315,236 B2 4/2016 Gasper
9,334,022 B2 5/2016 Gasper

* cited by examiner

WAKE SHAPING SYSTEM FOR A BOAT

PRIORITY OF THE APPLICATION

The present disclosure is a continuation of and claims priority to U.S. patent application Ser. No. 14/662,116, which will issue as U.S. Pat. No. 9,150,289, which is a continuation of and claims priority to U.S. Pat. No. 9,038,560, both of which are hereby incorporated by reference in their entireties.

TECHNICAL FIELD

The present disclosure generally relates to a wake shaping system for a boat, and more particularly, to a wake shaping system for wakesurfing behind an inboard boat.

BACKGROUND

During the first half of the twentieth century, waterskiing emerged as a popular recreational activity, allowing individuals to ski behind a boat on a lake, river, or ocean. The first waterski boats, however, were wooden boats that produced large wakes because of the weight of the boats. In search of a smaller wake, which is advantageous for waterskiing, the first fiberglass inboard waterski boat was designed and built in the early 1960s. Throughout the 1970s, 1980s, 1990s, and today, inboard ski boat manufacturers continue to refine ski boat designs to produce the smallest, softest, cleanest wakes behind the boat at speeds in excess of 25 mph. These competition waterski boats, which are still manufactured today, are closed bow, flat-bottomed boats with a direct drive inboard engine mounted in the center of the boat. The shape of the hull is optimized to create small, soft wakes for tournament waterskiing, but the hull does not perform well on public waterways, which are often larger and more crowded than private waterski lakes. In addition, because the ski rope is attached to a ski pylon in front of the engine, passengers cannot sit in the back of the boat while a skier is skiing because the ski rope swings back and forth at head-height above the rear seat. As such, a day on the lake for a competition water-skier may only include one or two other people.

In the 1990s, inboard boat manufacturers began designing and manufacturing larger boats as a result of increased demand for boats that were comfortable for an entire family and that performed better on larger, public waterways. At the same time, and a result of the growing popularity of snowboarding, wakeboarding emerged as a popular alternative to competition slalom waterskiing. Unlike waterskiing, where a waterskier attempts to stay low on the surface of the water in order to increase his or her speed back and forth around buoys set in a slalom course, a wakeboarder attempts to perform tricks such as flips ("inverts") or spins when jumping the wakes behind the boat. Therefore, a new style of inboard boat emerged that provided wakeboarders with larger, firmer wakes needed to perform wakeboard tricks.

Compared to competition waterski boats, wakeboard boats are larger, open bow boats with a deep-V hull, a V-drive engine mounted in the rear of the boat, and a tower to attach the tow rope at an elevated point above the boat. By placing the engine in the rear of the boat and connecting the rope to the tower above the boat, wakeboard boats allow passengers to sit in wraparound-style seating while a wakeboarder is towed behind the boat. Wakeboard boats also include ballast systems to weight the hull of the boat down and displace more water, and therefore generate larger wakes behind the boat for wakeboarding. These ballast systems may be in the form of removable ballast bags, factory-installed ballast bags, internal hard plastic tanks, or lead weight positioned throughout the boat. With each ballast system, the goal is to create large, firm, and symmetrical wakes approximately 50 to 80 feet behind the boat when the boat is travelling between 18 and 25 mph.

In recent years, wakesurfing has emerged as a popular counterpart to wakeboarding, allowing a surfer to surf behind the same wakeboard boat without having to travel to the ocean. Compared to wakeboarding, wakesurfing is easier to learn, has a lower risk of injury, is performed closer to the boat, and has become just as popular, if not more popular, than wakeboarding. Wakesurfing, however, requires a different ballast configuration in a traditional wakeboarding boat than wakeboarding. The desired wakesurfing wake is located on one side (starboard, right, or driver's side; port, left, or passenger's side) of the boat, creating an asymmetrical wakesurf wake between approximately 5 and 20 feet behind the boat when the boat is travelling between 5 and 15 mph.

Conventional wakeboard boat ballast systems place hundreds or even thousands of pounds of water ballast in bags or tanks in the bow, midship, port stern, and/or starboard stern sections of the boat. For wakeboarding, all ballast is typically filled, creating a large, firm, symmetrical wake behind the boat at wakeboarding speeds. For wakesurfing, the ballast is only filled on one side of the boat, leaving the ballast on the opposite side empty. This configuration "sinks" or "lists" one side of the boat, tipping the boat and creating a large, unsymmetrical wake for wakesurfing on the listed side of the boat at wakesurfing speeds.

Conventional wakesurfing ballast configurations, however, have many disadvantages. First, by weighting only one side of the boat, the boat is unbalanced and difficult to control at slower speeds. After a surfer falls, it is difficult and dangerous to return to the fallen surfer at slower speeds and with reduced visibility. Second, traditional ballast takes up a large portion of the boat's storage capacity. Third, moving the ballast from one side to the other to create a surf wake on the opposite side can be difficult, time consuming, and cumbersome. With removable ballast tanks, an external pump is needed to fill or empty the tanks with water. These external pumps often leak and require priming in order to siphon water out of the tanks when emptying. Emptying one side and filling the opposite side with just one pump may take 20 minutes or more, depending on the speed of the pump. With internal hard ballast tanks, the ballast tanks may be filled or emptied with internal ballast pumps at the same time, reducing the time to switch sides, but still may take 10 minutes or more, depending on the speed of the pumps. As a result, in order to minimize the time spent filling and emptying ballast during a day on the lake, all wakeboarding is typically done at the same time, all left-side (port) surfing is done together, and all right-side (starboard) surfing is done together. However, this is inconvenient and requires undesired advanced planning to set the ballast for each rider's desired ballast configuration.

As a result, an improved wake shaping system that can be used interchangeably for wakeboarding, left-side surfing, and right-side surfing with one ballast configuration and without requiring filling or emptying of individual ballast tanks, listing the boat dangerously to one side, or lifting of the transom, which reduces the size of the wakeboarding or wakesurfing wakes is desired.

BRIEF SUMMARY

Disclosed herein is a wake shaping system for wakeboarding and wakesurfing behind a boat, and preferable for wakesurfing behind an inboard wakeboard boat.

In an embodiment, a boat comprising a wake shaping system for wakeboarding and wakesurfing is disclosed, the boat comprising a hull comprising a bow and a transom, starboard and port sides, a longitudinal axis extending from the bow to the transom along a centerline, a lateral axis extending from the port side to the starboard side substantially perpendicular to the longitudinal axis, and a transom axis extending from an upper edge of the transom to a lower edge of the transom substantially perpendicular to the longitudinal axis. The wake shaping system may comprise starboard and port wake shaping devices located aft of the transom. Each wake shaping device is operable to move between a first, non-deployed position and a second, deployed position. In the first, non-deployed positions, each wake shaping device does not extend outside or below the transom. In the second, deployed positions, a portion of each wake shaping device extends outside or below the transom.

When the starboard wake shaping device is in the deployed position, a port wakesurf wake is created. When the port wake shaping device is in the deployed position, a starboard wakesurf wake is created. When the second portions of the starboard and port wake shaping devices are both in the non-deployed positions, a symmetrical wakeboard wake is created.

In an embodiment, each wake shaping device may comprise a first mounting portion coupled to the transom of the boat and a second plate portion pivotably coupled to the first mounting portion In an embodiment, the first mounting portions of the first and second wake shaping devices are mounted directly to the transom at the starboard and port first mounting portions, and the first mounting portions of the first and second wake shaping devices are mounted directly to the transom slightly away from the starboard and port sides of the hull and above the lower edge of the transom.

In an embodiment, the second plate portion of the starboard wake shaping device pivots relative to the first mounting portion of the starboard wake shaping plate along a starboard pivot axis, wherein the starboard pivot axis is angled along the transom from the centerline to the starboard side approximately 40° above the lateral axis.

In an embodiment, the second plate portion of the port wake shaping device pivots relative to the first mounting portion of the port wake shaping plate along a port pivot axis, wherein the port pivot axis is angled along the transom from the centerline to the port side approximately 40° above the lateral axis.

In operation, when the second plate portion of the starboard wake shaping device is in the second, deployed position, the second plate portion extends between approximately 2" and 3" beyond the starboard side of the hull and extends between approximately 2" and 3" beyond the lower edge of the transom. When the second plate portion of the port wake shaping device is in the second, deployed position, the second portion extends between approximately 2" and 3" beyond the port side of the hull and extends between approximately 2" and 3" beyond the lower edge of the transom.

In an embodiment, the starboard and port worm drives are operable to pivot the second plate portions of the starboard and port wake shaping devices between the first, non-deployed positions and the second, deployed positions. The starboard and port worm drives are controlled by an electronic device or by mechanical means.

The first and second portions of the starboard and port wake shaping plates may be constructed from stainless steel or from fiberglass.

As disclosed herein, the starboard and port wake shaping devices do not provide lift to the transom and do not list the hull in either the first, non-deployed positions or the second, deployed positions.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
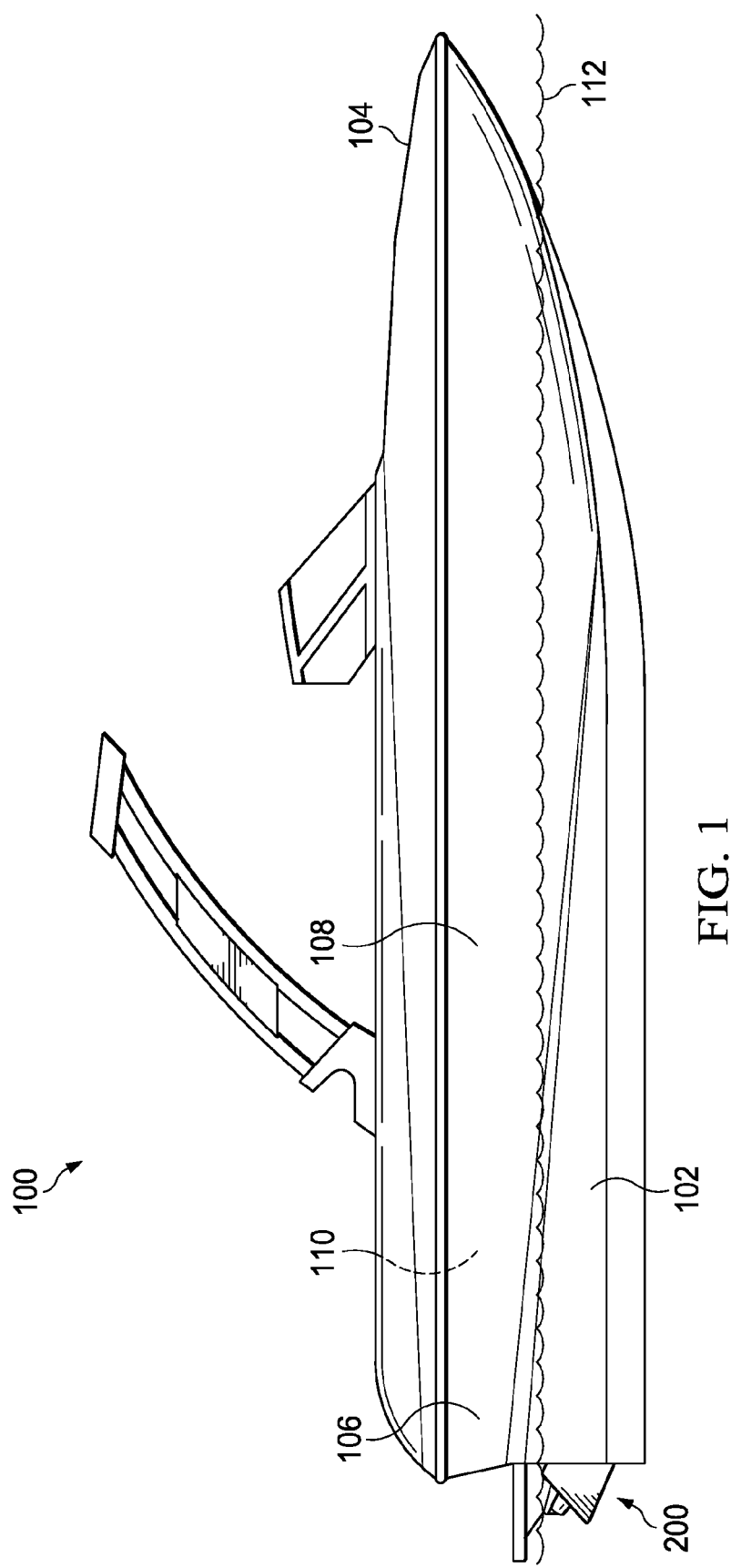
FIG. 1 illustrates a starboard side view of a boat comprising a wake shaping system, in accordance with one embodiment of the present disclosure.

While the making and using of various embodiments of the present disclosure are discussed in detail below, it should be appreciated that the present disclosure provides many applicable inventive concepts that can be embodied in a wide variety of specific contexts. The specific embodiments discussed herein are merely illustrative of specific ways to make and use the disclosure and do not limit the scope of the disclosure.

To facilitate the understanding of this disclosure, a number of marine terms are defined below. Terms defined herein have meanings as commonly understood by a person of ordinary skill in the areas relevant to the present disclosure. "Starboard" refers to the right-hand, or driver's, side of the boat. "Port" refers to the left-hand, or passenger's, side of the boat. "Bow" refers to the front of the boat. "Transom" and "stern" refer to the rear of the boat. Terms such as "a", "an", and "the" are not intended to refer to only a singular entity, but include the general class of which a specific example may be used for illustration. The terminology herein is used to describe specific embodiments of the disclosure, but their usage does not limit the disclosure, except as outlined in the claims.

Various embodiments of a wake shaping device for a boat are described. It is to be understood, however, that the following explanation is merely exemplary in describing the devices and methods of the present disclosure. Accordingly, several modifications, changes, and substitutions are contemplated.

As a boat travels through water, the hull of the boat displaces water both downwardly from the bottom of the boat and outwardly from the sides of boat, creating a cavity behind the transom of the boat. The displaced water then re-converges behind the boat, filling the cavity behind the transom, and creating a wave at a point of convergence. The wave extends from the point of convergence in a V-shape, creating wakes behind the boat that are suitable for wakeboarding or wakesurfing. Because of known principles of fluid dynamics, the port side of the boat displaces water that creates the starboard wake past the point of convergence and the starboard side of the boat displaces water that creates the port wake past the point of convergence.

Wakeboard boat hulls are specifically designed with a running surface that shapes wakes to make optimum wakeboarding wakes that are large, firm, and symmetrical on both sides behind the boat at wakeboarding speeds and rope lengths, i.e., approximately 50 to 80 feet behind the boat when the boat is travelling between 18 and 25 mph. Therefore, wakeboard boat manufacturers do not want to change the running surface of the hull at wakeboard speeds in order to maintain optimum wakeboard wakes for wakeboarders.

In order to surf behind a wakeboard boat, however, the convergence point should delayed on one side, creating a large, curling, and asymmetrical wake behind the boat at wakesurfing speeds and rope lengths, i.e., approximately 5 and 20 feet behind the boat when the boat is travelling between 5 and 15 mph. In order to delay the convergence point on one side, the running surface of the boat should be manipulated. In order to create a left-side, or port, wakesurf wake, a starboard wake shaping device may be used to manipulate the starboard running surface, delaying the convergence point on the starboard side and shifting it starboard, therefore creating a smoother port wakesurf wake beyond the convergence point that is optimized for left-side wakesurfing. Conversely, in order to create a right-side, or starboard, wakesurf wake, a port wake shaping device may be used to manipulate the port running surface, delaying the convergence point on the port side and shifting it port, therefore creating a smoother starboard wakesurf wake beyond the convergence point that is optimized for right-side wakesurfing.

Professional athletes, recreational purists, and families often want to wakeboard and wakesurf on the same days behind the same boat and in back-to-back sets, any wake shaping device mounted to the transom of the boat should remain fully within the cavity behind the transom of the boat at wakeboard speeds, and therefore not change the running surface of the hull while wakeboarding, but should manipulate the running surfaces of one side of the boat at wakesurf speeds, and therefore create asymmetrical wakesurf wakes.

FIG. 1 illustrates a starboard side view of a boat 100 comprising a wake shaping system 200, in accordance with one embodiment of the present disclosure. The boat 100 comprises a hull 102 comprising a bow 104, a transom 106, a starboard side 108, and a port side 110. The wake shaping system 200 may be positioned aft of the transom 106 and below a waterline 112 when the boat 100 is floating. In an embodiment, the boat 100 may be a wakeboard boat comprising an inboard motor and V-drive transmission, an internal ballast system, and an elevated tow point, or tower, for attaching a rope for pulling a wakeboarder or wakesurfer by the boat. In an embodiment, the boat 100 may be a MB Sports B52 21 Widebody, a MB Sports F21 Tomcat, a MB Sports F22 Tomcat, a MB Sports B52 23 Widebody, or a MB Sports F24 Tomcat. However, in other embodiments, the boat 100 may be a direct drive inboard boat, a stern drive inboard/outboard (I/O) boat, or an outboard boat.

Figure 2:
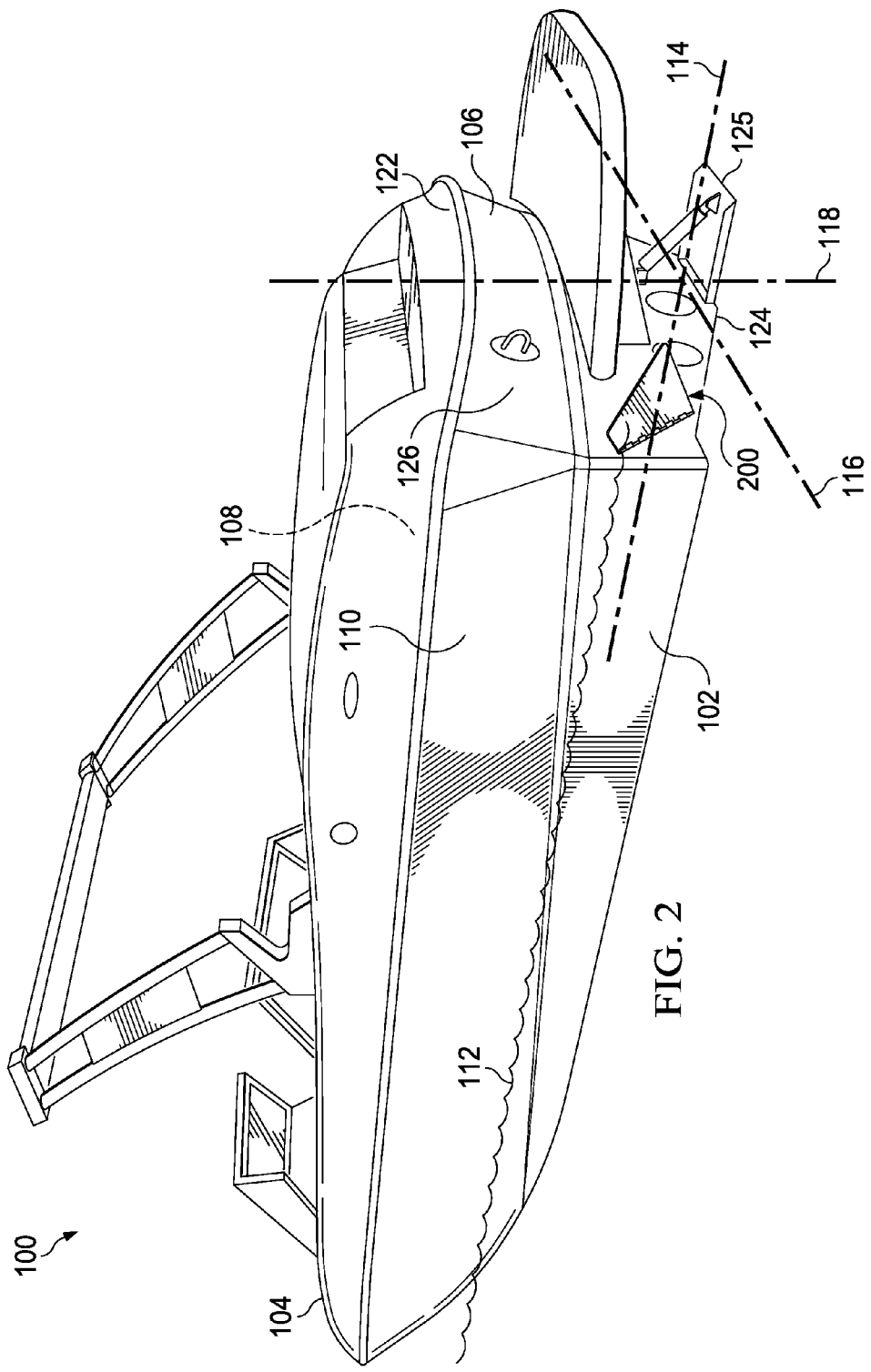
FIG. 2 illustrates a rear three-quarters perspective view of the boat of FIG. 1, in accordance with one embodiment of the present disclosure.

FIG. 2 illustrates a rear three-quarters perspective view of the boat 100 of FIG. 1, in accordance with one embodiment of the present disclosure. As depicted in FIG. 2, the hull 102 comprises a longitudinal axis 114 extending from the bow 104 to the transom 106 along a centerline 120, a lateral axis extending from the starboard side 108 to the port side 110, and a transom axis 118 extending from an upper edge 122 of the transom 106 to a lower edge 124 of the transom 106 along a transomline 126. The lateral axis 116 may be substantially perpendicular to the longitudinal axis 114. The transom axis 118 may be substantially perpendicular to the longitudinal axis 114 along the transomline 126. The boat 100 may comprise and optional center cavitation plate 125 that may be operable to control the elevational trim of the bow 104 of the boat 100 relative to the transom 106 of the boat 100.

Figure 3:
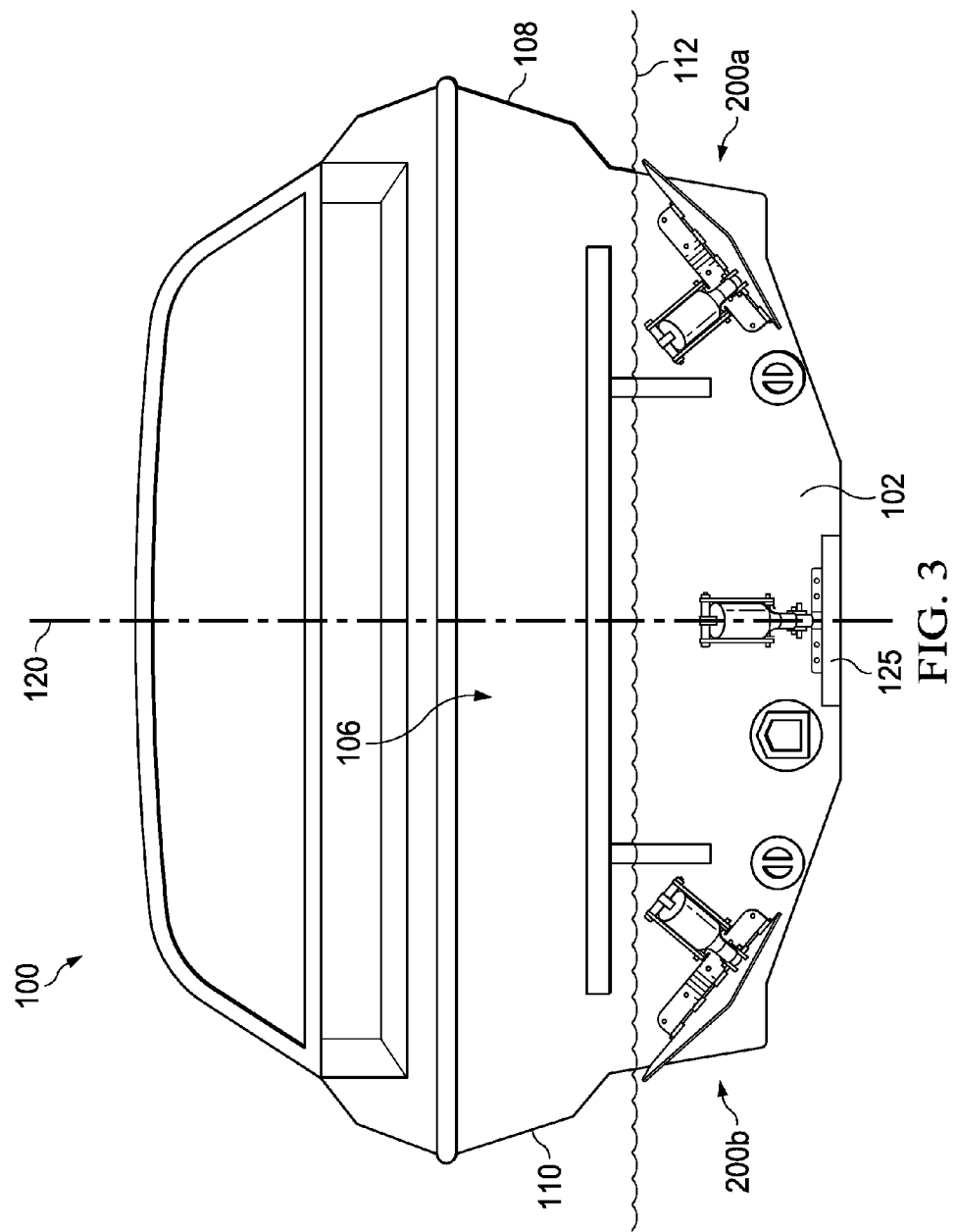
FIG. 3 illustrates a rear view of the boat of FIG. 1, in accordance with one embodiment of the present disclosure.

FIG. 3 illustrates a rear view of the boat 100 of FIG. 1, in accordance with one embodiment of the present disclosure. As depicted in FIG. 3, the wake shaping system 200 may comprise a starboard wake shaping device 200a and a port wake shaping device 200b. Both the starboard and port wake shaping devices 200a, 200b may be located aft of the transom 106 below the waterline 112 and may be mounted directly to the transom 106. The starboard wake shaping device 200a may be located right of the centerline 120 and proximate to the starboard side 108 of the hull 102, and the port wake shaping device 200b may be located left of the centerline 120 and proximate to the port side 110 of the hull 102. Both the starboard and port wake shaping devices 200a, 200b may be mounted slightly away from the starboard and port sides 108, 110, respectively, towards the centerline 120 and slightly above the lower edge 124 of the transom 106 such when the wake shaping devices 200a, 200b are not deployed, the wake shaping devices 200a, 200b do not interfere with the running surface of the hull 102 or negatively impact the wakeboard wake behind the boat 100 and remain within the cavity created behind the transom 106 at wakeboard speeds. The optional center cavitation plate 125 may be located at the lower edge 124 of the transom 106 along the centerline 120.

Figure 4:
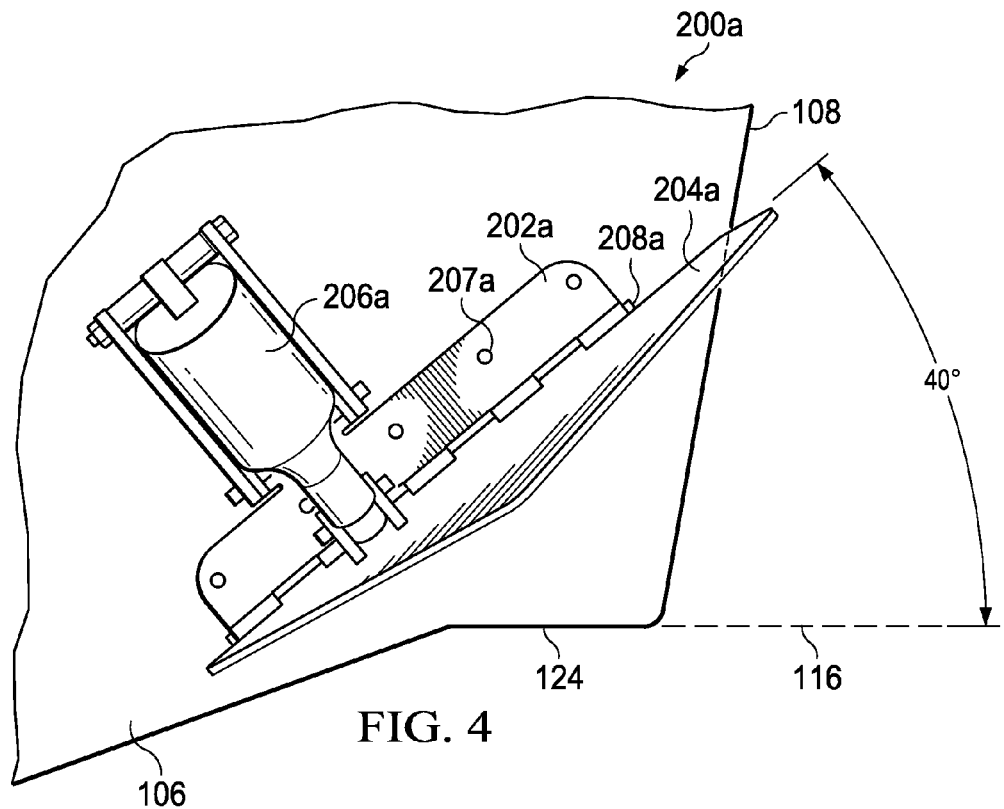
FIG. 4 illustrates a rear view of a starboard wake shaping device in a non-deployed position, in accordance with one embodiment of the present disclosure.

FIG. 4 illustrates a rear view of a starboard wake shaping device 200a in a first, non-deployed position, in accordance with one embodiment of the present disclosure. The starboard wake shaping device 200a may comprise a first mounting portion 202a and a second plate portion 204a. The first mounting portion 202a may be coupled directly to the transom 106 at a plurality of mounting apertures 207a and may be fixed relative to the transom 106. The second plate portion 204a may be pivotably coupled to the first mounting portion 202a with a pivot pin 208a. The second plate portion 204a may be operable to pivot independently relative to the fixed first mounting portion 202a at the pivot pin 208a and may be operable to pivot approximately 90° or more. The starboard wake shaping device 200a may further comprise a starboard worm drive 206a coupled to the transom 106 at a first end and coupled to the second plate portion 204a at a second end. The starboard worm drive 206a may be operable to pivot the second plate portion 204a relative to the first mounting portion 202a. In an embodiment, the starboard worm drive 206a is a Lenco marine actuator.

As depicted in FIG. 4, the starboard wake shaping device 200a may be mounted to the transom 106 such that the pivot pin 208a is angled along the transom 106 from the centerline of the hull to the starboard side 108 of the hull approximately 40° above the lateral axis 116 of the hull or the waterline. In other embodiments, the starboard wake shaping device 200a may be mounted to the transom 106 such that the pivot pin 208a is angled along the transom 106 from the centerline of the hull to the starboard side 108 of the hull between approximately 30° and 60° above the lateral axis 116 of the hull or the waterline.

In the first, non-deployed position, the second plate portion 204a of the starboard wake shaping device 200a extends aft behind the transom 106 in a direction substantially parallel to the longitudinal axis so that when the starboard wake shaping device 200a is not deployed, the second plate portion 204a does not interfere with the running surface of the hull or negatively impact the wakeboard wake behind the boat.

Figure 5:
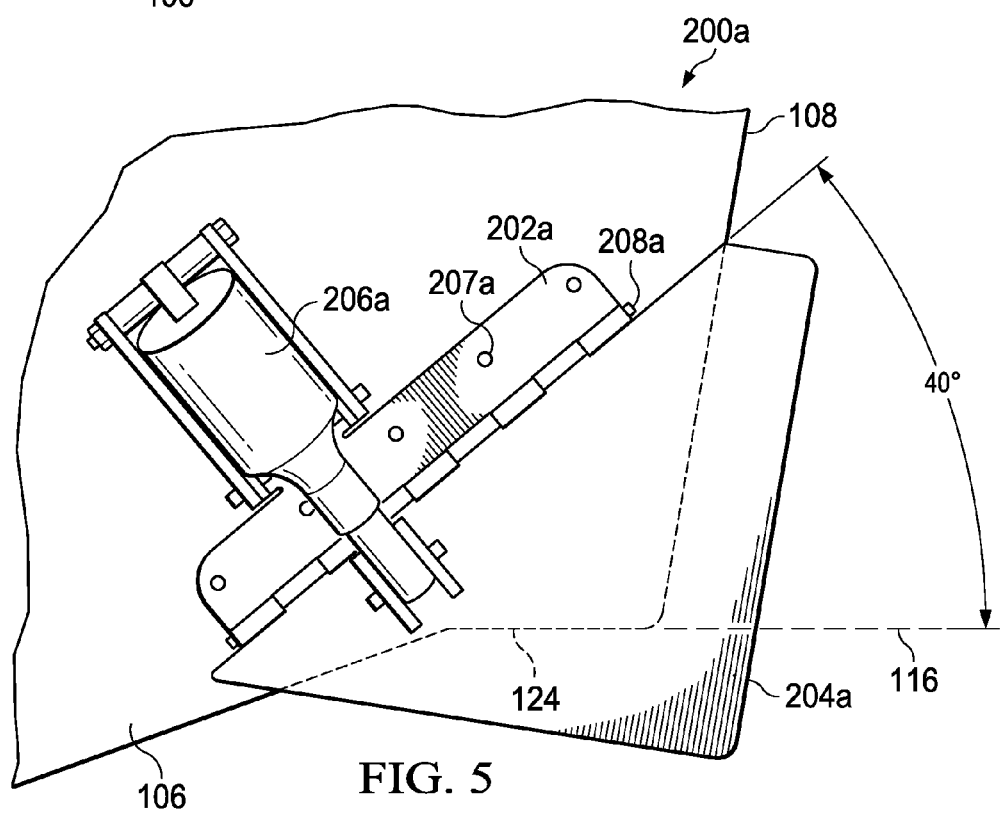
FIG. 5 illustrates a rear view of the starboard wake shaping device of FIG. 4 in a deployed position, in accordance with one embodiment of the present disclosure.

FIG. 5 illustrates a rear view of the starboard wake shaping device 200a of FIG. 4 in a second, deployed position, in accordance with one embodiment of the present disclosure. In the second, deployed position, the starboard worm drive 206a pivots the second plate portion 204a downwardly so that the second plate portion 204a is substantially parallel to the transom axis and substantially perpendicular to the longitudinal axis of the hull. In the second, deployed position, the starboard wake shaping device 200a extends outside the starboard side 108 of the transom 106 and below the lower edge 124 of the transom 106. When the second plate portion 204a of the starboard wake shaping device 200a is in the second, deployed position, the convergence point behind the boat is shifted to the right and a left-side (port) wakesurf wake is created.

Figure 6:
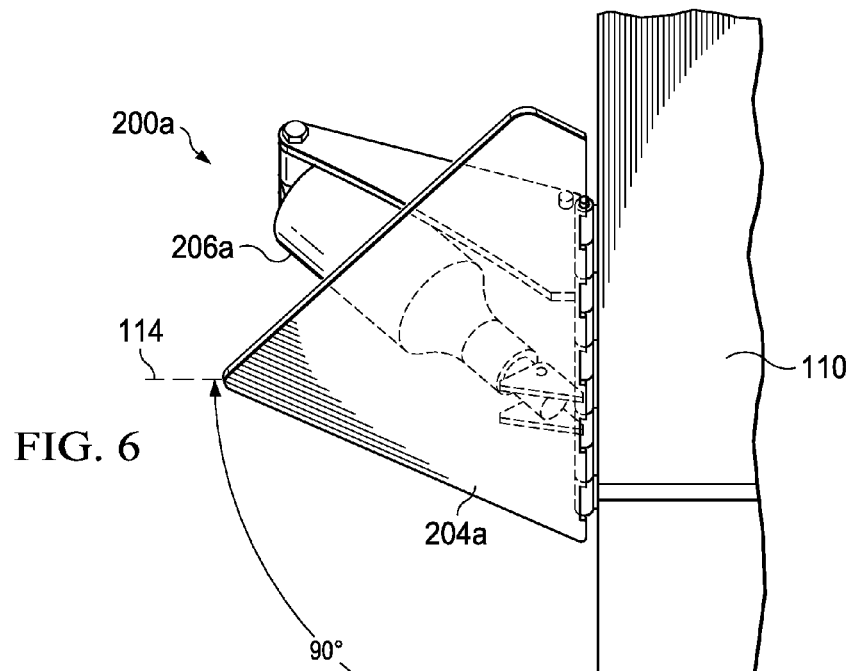
FIG. 6 illustrates a starboard side view of the starboard wake shaping device of FIG. 4 in the non-deployed position, in accordance with one embodiment of the present disclosure.
Figure 7:
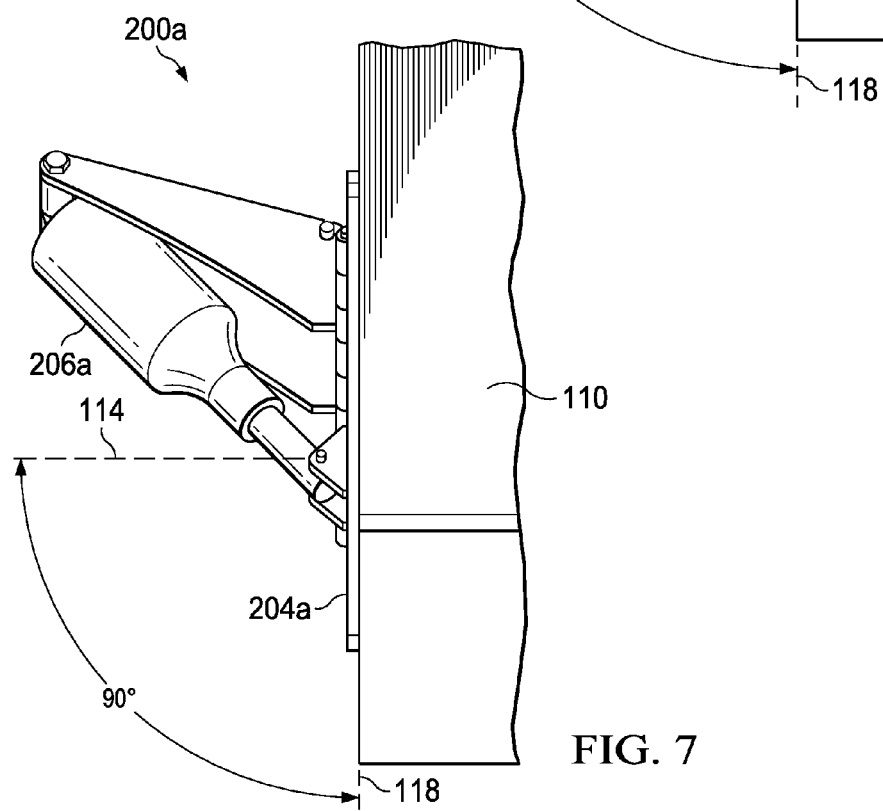
FIG. 7 illustrates a starboard side view of the starboard wake shaping device of FIG. 4 in the deployed position, in accordance with one embodiment of the present disclosure.

FIG. 6 illustrates a starboard side view of the starboard wake shaping device 200a of FIG. 4 in the non-deployed position, in accordance with one embodiment of the present disclosure. FIG. 7 illustrates a starboard side view of the starboard wake shaping device 200a of FIG. 4 in the deployed position, in accordance with one embodiment of the present disclosure. The starboard worm drive 206a is operable to pivot the second plate portion 204a approximately 90° from the first, non-deployed position depicted in FIG. 6 to the second, deployed position depicted in FIG. 7. In the first, non-deployed position, the second plate portion 204a of the starboard wake shaping device 200a extends aft behind the transom 106 in a direction substantially parallel to the longitudinal axis 114. In the second, deployed position, the second plate portion 204a is substantially parallel to the transom axis 118 and substantially perpendicular to the longitudinal axis of the hull 114.

Figure 8:
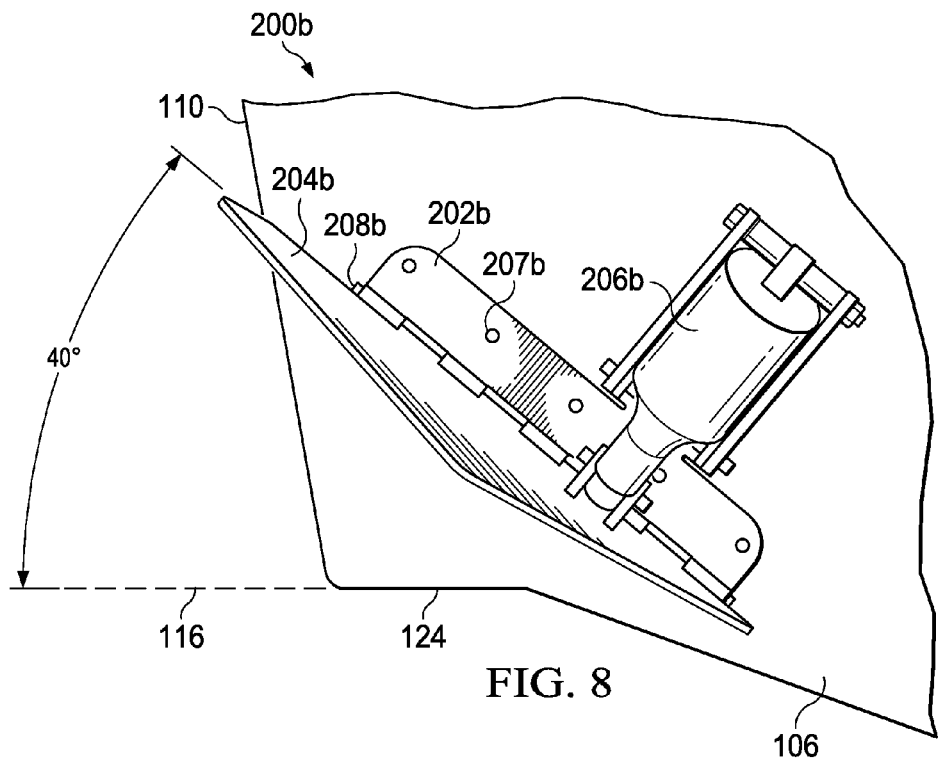
FIG. 8 illustrates a rear view of a port wake shaping device in a non-deployed position, in accordance with one embodiment of the present disclosure.

FIG. 8 illustrates a rear view of the port wake shaping device 200b in a first, non-deployed position, in accordance with one embodiment of the present disclosure. The port wake shaping device 200b may comprise a first mounting portion 202b and a second plate portion 204b. The first mounting portion 202b may be coupled directly to the transom 106 at a plurality of mounting apertures 207b and may be fixed relative to the transom 106. The second plate portion 204b may be pivotably coupled to the first mounting portion 202b with a pivot pin 208b. The second plate portion 204b may be operable to pivot independently relative to the fixed first mounting portion 202b at the pivot pin 208b and may be operable to pivot approximately 90° or more. The port wake shaping device 200b may further comprise a port worm drive 206b coupled to the transom 106 at a first end and coupled to the second plate portion 204b at a second end. The port worm drive 206b may be operable to pivot the second plate portion 204b relative to the first mounting portion 202b. In an embodiment, the port worm drive 206b is a Lenco marine actuator.

As depicted in FIG. 8, the port wake shaping device 200b may be mounted to the transom 106 such that the pivot pin 208b is angled along the transom 106 from the centerline of the hull to the port side 110 of the hull approximately 40° above the lateral axis 116 of the hull or the waterline. In other embodiments, the port wake shaping device 200b may be mounted to the transom 106 such that the pivot pin 208b is angled along the transom 106 from the centerline of the hull to the port side 110 of the hull between approximately 30° and 60° above the lateral axis 116 of the hull or the waterline.

In the first, non-deployed position, the second plate portion 204b of the port wake shaping device 200b extends aft behind the transom 106 in a direction substantially parallel to the longitudinal axis so that when the port wake shaping device 200b is not deployed, the second plate portion 204b does not interfere with the running surface of the hull or negatively impact the wakeboard wakes behind the boat.

Figure 9:
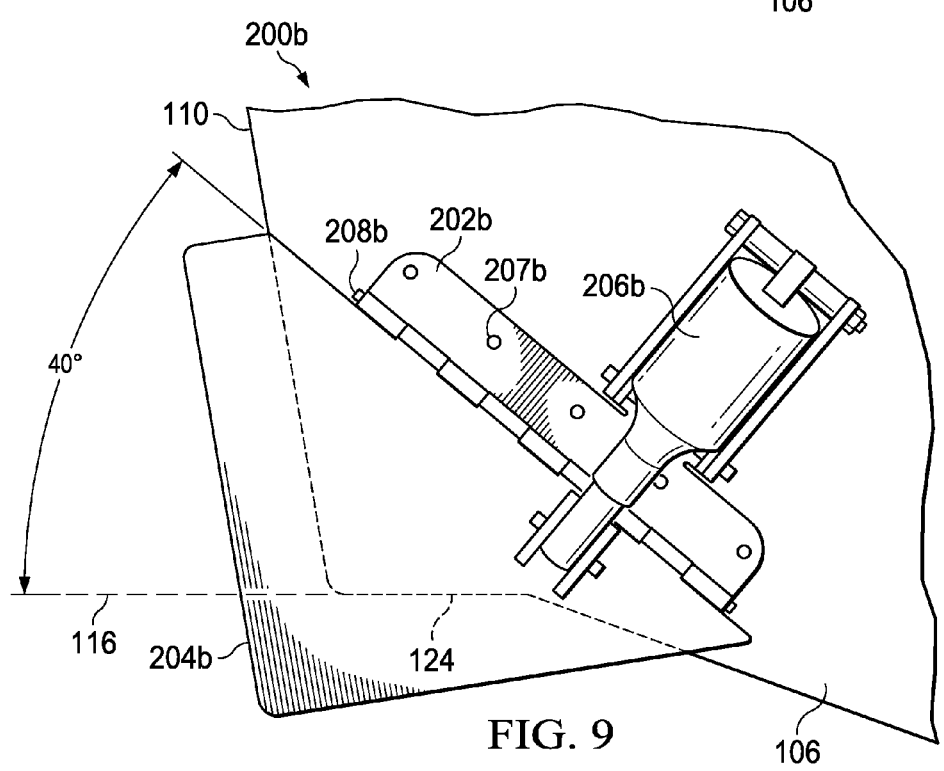
FIG. 9 illustrates a rear view of the port wake shaping device of FIG. 8 in a deployed position, in accordance with one embodiment of the present disclosure.

FIG. 9 illustrates a rear view of the port wake shaping device 200b of FIG. 8 in a second, deployed position, in accordance with one embodiment of the present disclosure. In the second, deployed position, the port worm drive 206b pivots the second plate portion 204b downwardly so that the second plate portion 204b is substantially parallel to the transom axis and substantially perpendicular to the longitudinal axis of the hull. In the second, deployed position, the port wake shaping device 200b extends outside the port side 110 of the transom 106 and below the lower edge 124 of the transom 106. When the second plate portion 204b of the port wake shaping device 200b is in the second, deployed position, the convergence point behind the boat is shifted to the left and a right-side (starboard) wakesurf wake is created.

Figure 10:
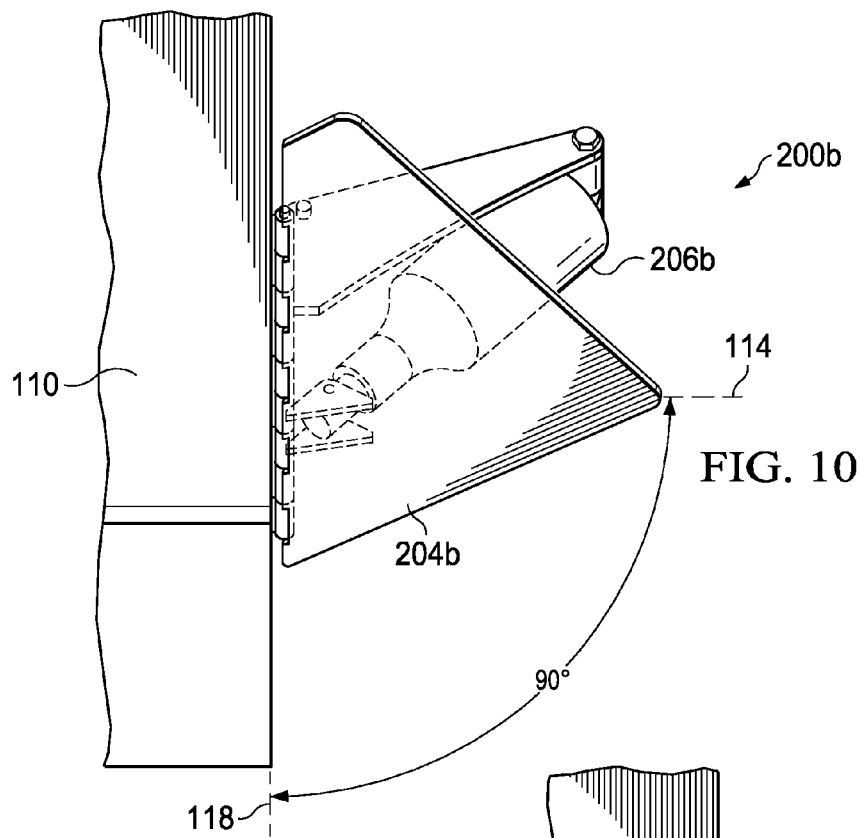
FIG. 10 illustrates a port side view of the port wake shaping device of FIG. 8 in the non-deployed position, in accordance with one embodiment of the present disclosure.
Figure 11:
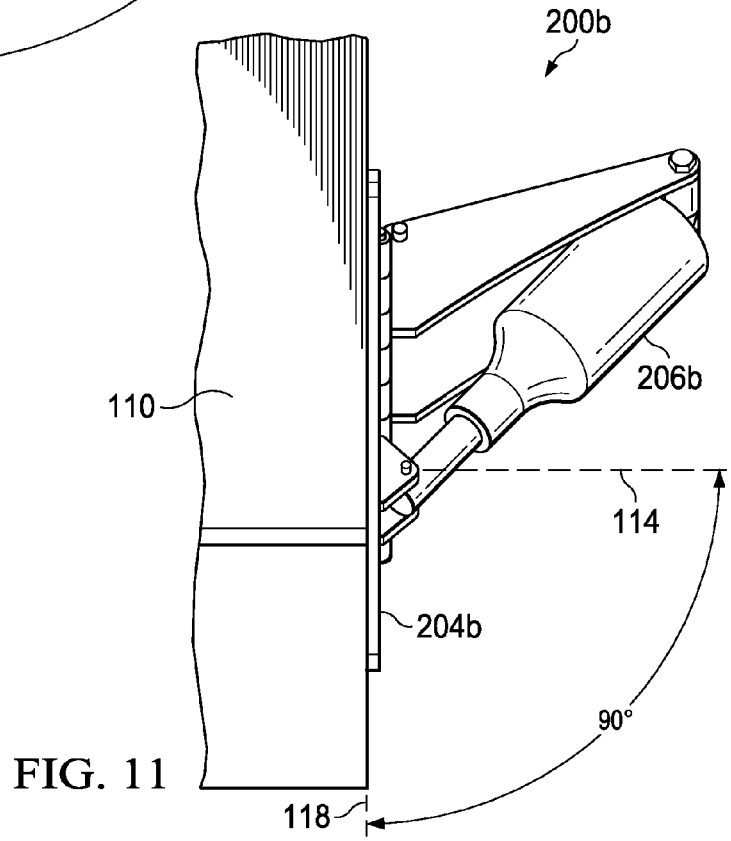
FIG. 11 illustrates a port side view of the port wake shaping device of FIG. 8 in the deployed position, in accordance with one embodiment of the present disclosure.

FIG. 10 illustrates a port side view of the port wake shaping device 200b of FIG. 8 in the non-deployed position, in accordance with one embodiment of the present disclosure. FIG. 11 illustrates a port side view of the port wake shaping device 200b of FIG. 8 in the deployed position, in accordance with one embodiment of the present disclosure. The port worm drive 206b is operable to pivot the second plate portion 204b approximately 90° from the first, non-deployed position depicted in FIG. 10 to the second, deployed position depicted in FIG. 11. In the first, non-deployed position, the second plate portion 204b of the port wake shaping device 200b extends aft behind the transom 106 in a direction substantially parallel to the longitudinal axis 114. In the second, deployed position, the second plate portion 204b is substantially parallel to the transom axis 118 and substantially perpendicular to the longitudinal axis 114 of the hull.

Figure 12:
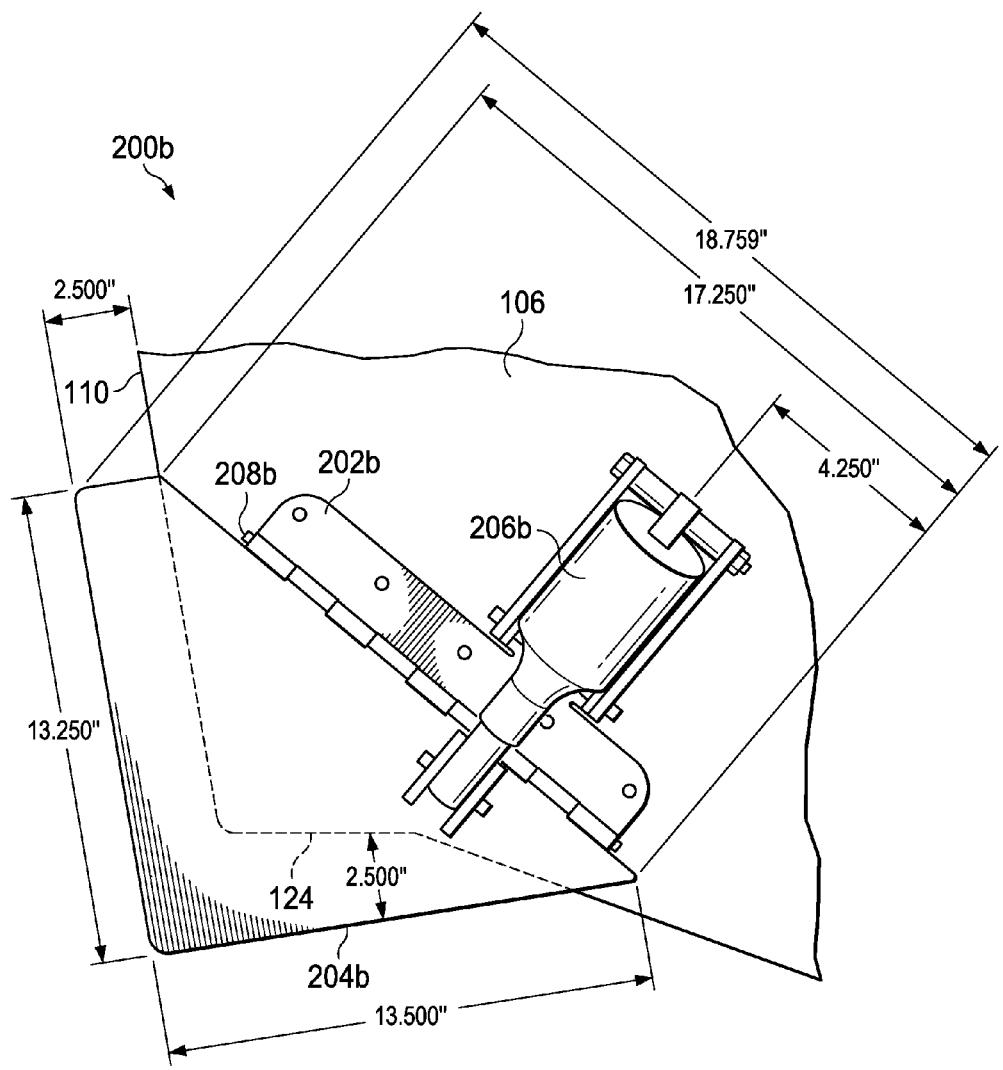
FIG. 12 illustrates a rear view of the port wake shaping device of FIG. 8 in the deployed position, in accordance with one embodiment of the present disclosure.

FIG. 12 illustrates a rear view of the port wake shaping device 200b of FIG. 8 in the deployed position, in accordance with one embodiment of the present disclosure. As depicted in FIG. 12, the port wake shaping device 200b may comprise the first mounting portion 202b, the second plate portion 204b, the port worm drive 206b, and may be mounted to the transom 106 at the first mounting portion 202b. In an embodiment, in the deployed position, the second plate portion 204 may extend between approximately 2" and 3" beyond the port side 110 of the hull and may extend between approximately 2" and 3" beyond the lower edge 124 of the transom 106. In an embodiment, in the deployed position, the second plate portion 204 may preferably extend approximately 2.5" beyond the port side 110 of the hull and may preferably extend approximately 2.5" beyond the lower edge 124 of the transom 106.

As depicted in FIG. 12, in an embodiment, various dimensions of the second plate portion 204b of the port wake shaping device 200b used to create desirable wakesurf wakes are disclosed. A pivot edge of the second plate portion 204b proximate to the pivot pin 208b may be approximately 17.250" long. Moving in a clockwise direction, a lower edge of the second plate portion 204b extending below the lower edge 124 of the transom 106 may be approximately 13.500" long. An outside edge of the second plate portion 204b extending outside of the port side 110 of the hull may be approximately 13.250" long. A connecting edge of the second plate portion 204b connecting the outside edge to the pivot edge may be approximately 2.500" long. While not depicted in FIG. 12, the dimensions of the second plate portion 204a of the starboard wake shaping device 200a may be inverted and substantially the same as the dimensions of the second plate portion 204b of the port wake shaping device 200b.

As described in relation to FIGS. 4-12, in an embodiment, the first mounting portions 202a, 202b and the second plate portions 204a, 204b of the starboard and port wake shaping devices 200a, 200b may be constructed from stainless steel, galvanized steel, fiberglass, wood, or any other material suitable for a marine environment.

Figure 13:
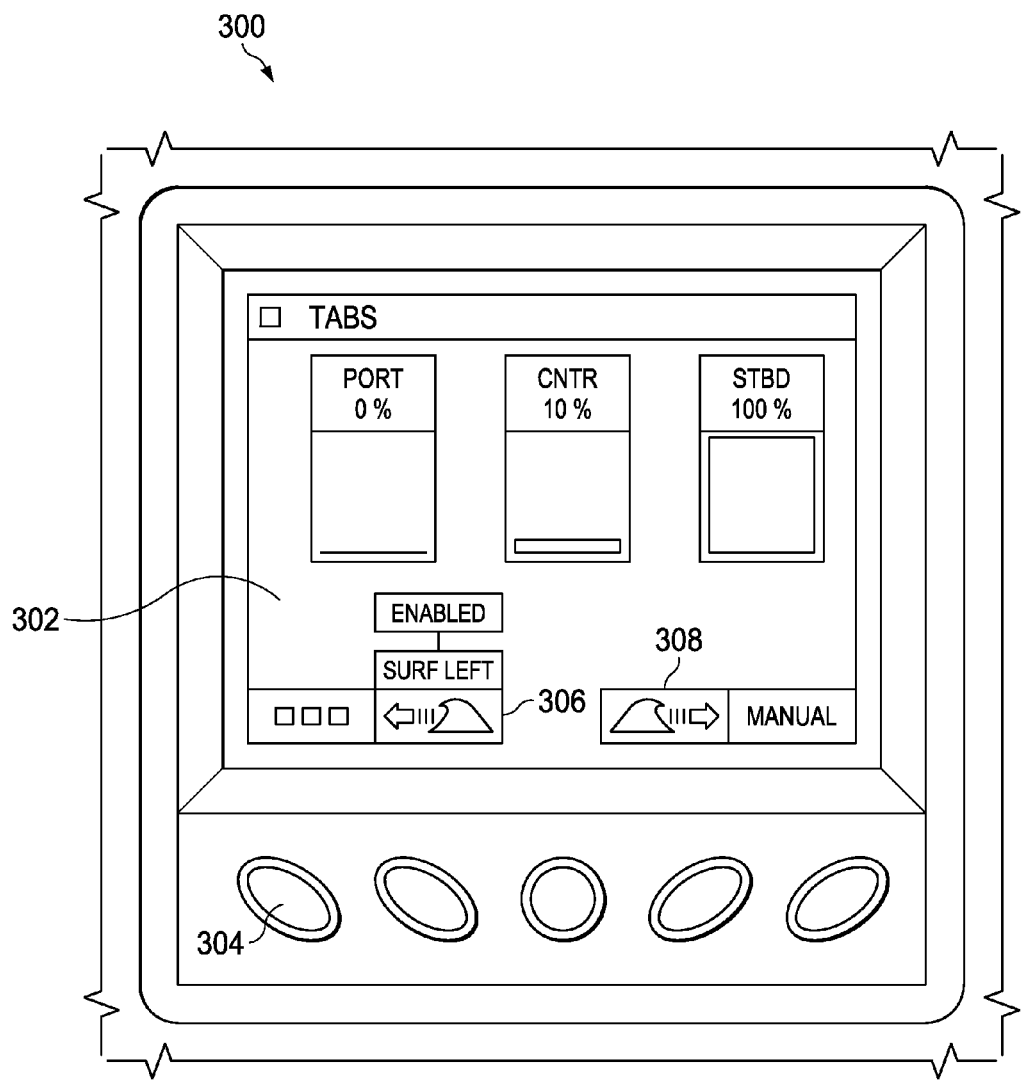
FIG. 13 illustrates a first view of an electronic device for controlling the wake shaping system of FIG. 1, in accordance with one embodiment of the present disclosure.
Figure 14:
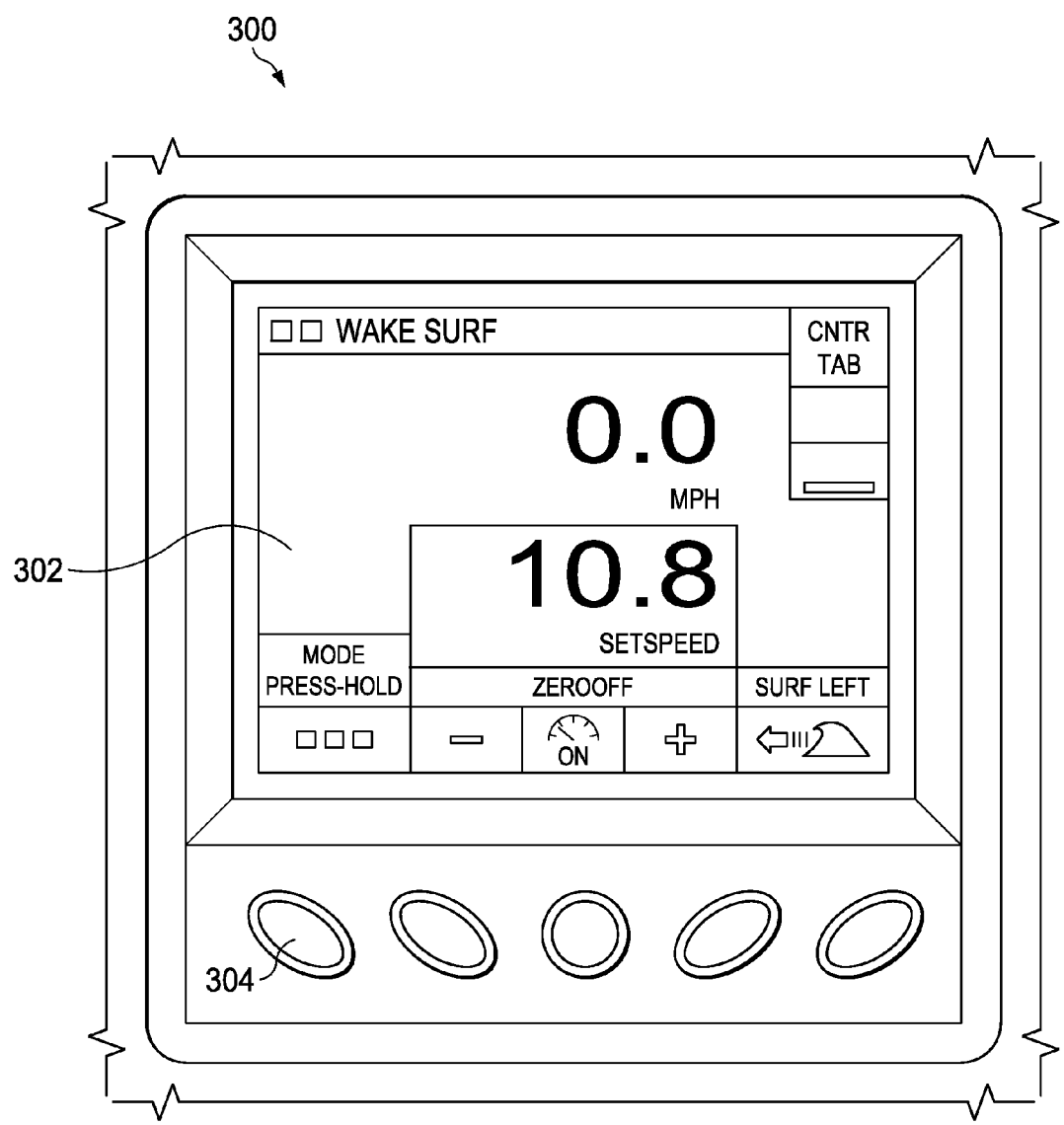
FIG. 14 illustrates a second view of the electronic device of FIG. 13 for controlling the wake shaping system, in accordance with one embodiment of the present disclosure.

FIG. 13 illustrates a first view of an electronic device 300 for controlling the wake shaping system 200 of FIG. 1, in accordance with one embodiment of the present disclosure. FIG. 14 illustrates a second view of the electronic device 300 of FIG. 13 for controlling the wake shaping system 200, in accordance with one embodiment of the present disclosure. The electronic device 300 may be located at the driver's helm of the boat, i.e., on a dashboard behind a steering wheel or proximate to the driver's hand. The electronic device 300 may be any known controller operable to work in a marine environment. The electronic device 300 may comprise a CPU, ROM, and/or RAM, a touch screen 302, and/or one or more input buttons, switches, or dials 304. In an embodiment, the electronic device 300 is a Murphy engine monitor and display that is integrated with the wake shaping device 200, ballast systems, stereo, and cruise control.

In an embodiment, the electronic device 300 may be operable to control the wake shaping system 200. As depicted in FIG. 13, in a first view, the electronic device 300 may display percentages of deployment for the starboard wake shaping device, the port wake shaping device, and the optional center cavitation plate that may be operable to control the elevational trim of the bow of the boat relative to the stern of the boat.

As discussed in the examples below, 0% may refer to the first, non-deployed positions and 100% may refer to the second, deployed positions of the starboard and port wake shaping devices 200a, 200b.

In operation, if a user selects a "Surf Left" button 306 on the electronic device 300, for example, the electronic device 300 may activate the starboard wake shaping device according to factory or user presets. When activated, the starboard worm drive may pivot the starboard wake shaping device approximately 90° from the first, non-deployed position to the second, deployed position. With a "Surf Left" selection, the port wake shaping device would remain in the non-deployed position behind the transom of the boat and the optional center cavitation plate may be used, as necessary, to help get the boat on plane. In an embodiment, the electronic device 300 presets for surfing a left-side, or port, wakesurfing wake may be 0% port wake shaping device, 0% center cavitation plate, and 100% starboard wake shaping device.

If a user selects a "Surf Right" button 308 on the electronic device 300, the electronic device 300 may activate the port wake shaping device according to factory or user presets. When activated, the port worm drive may pivot the port wake shaping device approximately 90° from the first, non-deployed position to the second, deployed position. With a "Surf Right" selection, the starboard wake shaping device would remain in the non-deployed position behind the transom of the boat and the optional center cavitation plate may be used, as necessary, to help get the boat on plane. In an embodiment, the electronic device 300 presets for surfing a right-side, or starboard, wakesurfing wake may be 100% port wake shaping device, 0% center cavitation plate, and 0% starboard wake shaping.

Although not shown, if a user selects "Wakeboard," both the starboard and port wake shaping devices may remain in the non-deployed positions behind the transom of the boat and the optional center cavitation plate may be used, as necessary, to help get the boat on plane. In an embodiment, the electronic device 300 presets for wakeboarding may be 0% port wake shaping device, 0% center cavitation plate, and 0% starboard wake shaping device.

As depicted in FIG. 13, the user may also have the option of controlling the port wake shaping device, the starboard wake shaping device, and the center cavitation plate manually in order to customize the wakeboarding and/or wakesurfing wakes behind the boat.

As depicted in FIG. 14, the second view of the electronic device 300 may display the current speed of the boat, a desired speed of the boat, and the current wake settings, i.e., Surf Left, Surf Right, or Wakeboard.

Figure 15:
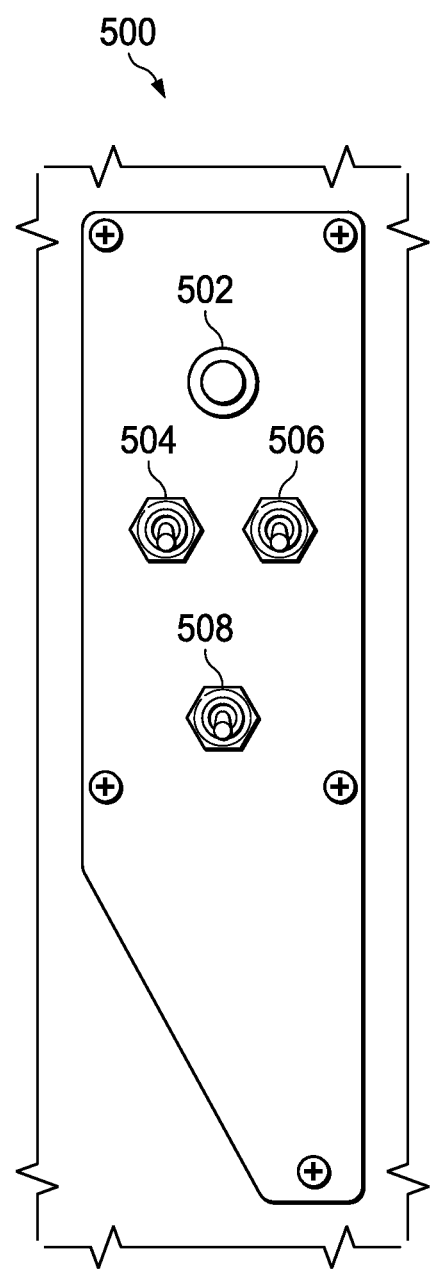
FIG. 15 illustrates a profile view of mechanical means for controlling the wake shaping system of FIG. 1, in accordance with one embodiment of the present disclosure.

FIG. 15 illustrates a profile view of mechanical means 500 for controlling the wake shaping system of FIG. 1, in accordance with one embodiment of the present disclosure. The mechanical means 500 may be located at the driver's helm proximate to a throttle lever and may be used in combination with the electronic device 300 controls discussed in relation to FIGS. 13 and 14. The mechanical means 500 may comprise a surf side switch button 502, a port wake shaping device toggle switch 504, a starboard wake shaping device toggle switch 506, and a center cavitation plate toggle switch 508. The mechanical means 500 may be used to switch between a left-side wakesurf wake, a right-side wakesurf wake, or a wakeboard wake.

If a user wants to surf a left-side, or port, wakesurf wake, for example, the starboard wake shaping device toggle switch 506 may activate the starboard worm drive and may pivot the starboard wake shaping device approximately 90° from the first, non-deployed position to the second, deployed position. In an embodiment, the electronic device may display the settings for surfing a left-side, or port, wakesurfing wake and may be 0% port wake shaping device, 0% center cavitation plate, and 100% starboard wake shaping device.

If a user wants to surf a right-side, or starboard, wakesurf wake, the port wake shaping device toggle switch 504 may activate the port worm drive and may pivot the port wake shaping device from the first, non-deployed position to the second, deployed position. In an embodiment, the electronic device may display the settings for surfing a right-side, or starboard, wakesurfing wake and may be 100% port wake shaping device, 0% center cavitation plate, and 0% starboard wake shaping device.

Center cavitation plate toggle switch 508 may be used to control an optional center cavitation plate to help get the boat on plane and/or control the trim angle of the bow of the boat relative to the stern of the boat.

The surf side switch button 502 may be used to switch the side of the wakesurf wake while the boat is travelling and a surfer is surfing behind the boat with the single touch of a button. For example, if a surfer is surfing on a left-side, or port, wakesurf wake and wants to switch to a right-side, or starboard, wakesurf wake, the driver of the boat may depress the switch button 502. Via controls from the electronic device 300 (not shown), the wake shaping system 200 may switch instantaneously from 0% port wake shaping device, 0% center cavitation plate, and 100% starboard wake shaping device to 100% port wake shaping device, 0% center cavitation plate, and 0% starboard wake shaping device.

Conversely, if a surfer is surfing on a right-side, or starboard, wakesurf wake and wants to switch to a left-side, or port, wakesurf wake, the driver of the boat may depress the switch button 502. Via controls from the electronic device 300 (not shown), the wake shaping system 200 may switch instantaneously from 100% port wake shaping device, 0% center cavitation plate, and 0% starboard wake shaping device to 0% port wake shaping device, 0% center cavitation plate, and 100% starboard wake shaping device.

Depressing the switch button 502 may further activate a horn, light, or other signaling mechanism that provides a signal to a surfer behind the boat that the wakesurf wakes are shifting and it is the preferred time to attempt to transfer from a left-side surf wake to a right-side surf wake or vice-versa.

While not depicted in FIGS. 13-15, the electronic device 300 and/or mechanical means 400 may also be used for controlling an internal ballast system in the boat. In an embodiment, the electronic device 300 or mechanical means 400 may be operable to control one or more ballast gates located at the stern of the boat. When the boat is sitting in the water and not moving and the ballast gates are opened, one or more internal ballast tanks may be filled using gravity until the tanks are full. After the tanks are full, the one or more gates may be closed, ensuring that the ballast tanks remain full when the boat is running and is on plane. When the boat is running and is on plane, the bow of the boat may be higher than the stern. If the one or more ballast gates are opening while the boat is on plane, the one or more internal ballast tanks may be emptied using gravity until the tanks are empty. After the tanks are emptied and before the boat is stopped again, the one or more gates may be closed, ensuring that the ballast tanks remain empty when the boat is stopped and sitting in the water. In an embodiment, the electronic device 300 or mechanical means 400 may also be operable to control an internal ballast system comprising a plurality of hard tanks or bags filled and emptied by ballast pumps.

In an embodiment, the electronic device 300 may further be operable to control the speed of the boat, control the sound system, and display water and/or air temperatures, among various other features.

As disclosed herein, the wake shaping system 200 can be used interchangeably for wakeboarding, left-side surfing, and right-side surfing with one ballast configuration and without requiring filling or emptying of individual ballast tanks To create advance, large wakeboard and wakesurf wakes, a full ballast configuration is used in conjunction with the wake shaping system 200 disclosed herein. To create intermediate, smaller wakeboard and wakesurf wakes, less than full ballast may be used in conjunction with the wake shaping system 200 disclosed herein. In addition, the wake shaping system 200 does not require dangerous listing of the boat to one side in order to create surfable wakesurf wakes. The wake shaping system 200 also does not lift the transom of the boat, which may undesirably reduce the size of the wakeboarding or wakesurfing wakes.

While various embodiments in accordance with the principles disclosed herein have been described above, it should be understood that they have been presented by way of example only, and are not limiting. Thus, the breadth and scope of the invention(s) should not be limited by any of the above-described exemplary embodiments, but should be defined only in accordance with the claims and their equivalents issuing from this disclosure. Furthermore, the above advantages and features are provided in described embodiments, but shall not limit the application of such issued claims to processes and structures accomplishing any or all of the above advantages.

It will be understood that the principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

Additionally, the section headings herein are provided for consistency with the suggestions under 37 CFR 1.77 or otherwise to provide organizational cues. These headings shall not limit or characterize the invention(s) set out in any claims that may issue from this disclosure. Specifically and by way of example, although the headings refer to a "Field of Invention," such claims should not be limited by the language under this heading to describe the so-called technical field. Further, a description of technology in the "Background of the Invention" section is not to be construed as an admission that technology is prior art to any invention(s) in this disclosure. Neither is the "Summary" to be considered a characterization of the invention(s) set forth in issued claims. Furthermore, any reference in this disclosure to "invention" in the singular should not be used to argue that there is only a single point of novelty in this disclosure. Multiple inventions may be set forth according to the limitations of the multiple claims issuing from this disclosure, and such claims accordingly define the invention(s), and their equivalents, that are protected thereby. In all instances, the scope of such claims shall be considered on their own merits in light of this disclosure, but should not be constrained by the headings set forth herein.

The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects.

As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature. In general, but subject to the preceding discussion, a numerical value herein that is modified by a word of approximation such as "about" may vary from the stated value by at least ±1, 2, 3, 4, 5, 6, 7, 10, 12 or 15%.

The term "or combinations thereof" as used herein refers to all permutations and combinations of the listed items preceding the term. For example, "A, B, C, or combinations thereof is intended to include at least one of: A, B, C, AB, AC, BC, or ABC, and if order is important in a particular context, also BA, CA, CB, CBA, BCA, ACB, BAC, or CAB. Continuing with this example, expressly included are combinations that contain repeats of one or more item or term, such as BB, AAA, AB, BBC, AAABCCCC, CBBAAA, CABABB, and so forth. The skilled artisan will understand that typically there is no limit on the number of items or terms in any combination, unless otherwise apparent from the context.

All of the compositions and/or methods disclosed and claimed herein can be made and executed without undue experimentation in light of the present disclosure. While the compositions and methods of this disclosure have been described in terms of preferred embodiments, it will be apparent to those of skill in the art that variations may be applied to the compositions and/or methods and in the steps or in the sequence of steps of the method described herein without departing from the concept, spirit and scope of the disclosure. All such similar substitutes and modifications apparent to those skilled in the art are deemed to be within the spirit, scope and concept of the disclosure as defined by the appended claims.

What is claimed is:

1. A boat comprising a wake shaping system for wakeboarding and wakesurfing, the boat comprising:
   a hull comprising a bow and a transom, starboard and port sides, a longitudinal axis extending from the bow to the transom along a centerline, a lateral axis extending from the port side to the starboard side substantially perpendicular to the longitudinal axis, and a transom axis extending from an upper edge of the transom to a lower edge of the transom substantially perpendicular to the longitudinal axis; and
   the wake shaping system comprising starboard and port wake shaping devices located aft of the transom;
   wherein each wake shaping device comprises a first mounting portion coupled to the transom and a second plate portion pivotably coupled to the first mounting portion, and wherein the first mounting portions of the first and second wake shaping devices are mounted directly to the transom at the starboard and port first mounting portions;
   wherein each wake shaping devices is operable to move between a first, non-deployed position and a second, deployed position;
   wherein the boat further comprises starboard and port worm drives operable to pivot the second plate portions of the starboard and port wake shaping devices between the first, non-deployed positions and the second, deployed positions;
   wherein in the first, non-deployed positions, each wake shaping device does not extend outside or below the transom of the boat;
   wherein in the second, deployed positions, at least a portion of each wake shaping device extends outside or below the transom;
   wherein when the starboard wake shaping device is in the deployed position, a port wakesurf wake is created; and
   wherein when the port wake shaping device is in the deployed position, a starboard wakesurf wake is created.

2. The boat of claim 1, wherein the first mounting portions of the first and second wake shaping devices are mounted directly to the transom slightly away from the starboard and port sides of the hull and above the lower edge of the transom.

3. The boat of claim 1, wherein the second plate portion of the starboard wake shaping device pivots relative to the first mounting portion of the starboard wake shaping plate along a starboard pivot axis.

4. The boat of claim 3, wherein the starboard pivot axis is angled along the transom from the centerline to the starboard side approximately 40° above the lateral axis.

5. The boat of claim 1, wherein the second plate portion of the port wake shaping device pivots relative to the first mounting portion of the port wake shaping plate along a port pivot axis.

6. The boat of claim 5, wherein the port pivot axis is angled along the transom from the centerline to the port side approximately 40° above the lateral axis.

7. The boat of claim 1, wherein when the second plate portion of the starboard wake shaping device is in the second, deployed position, the second plate portion extends between approximately 2" and 3" beyond the starboard side of the hull and extends between approximately 2" and 3" beyond the lower edge of the transom.

8. The boat of claim 1, wherein when the second plate portion of the port wake shaping device is in the second, deployed position, the second portion extends between approximately 2" and 3" beyond the port side of the hull and extends between approximately 2" and 3" beyond the lower edge of the transom.

9. The boat of claim 1, wherein the starboard and port worm drives are controlled by an electronic device.

10. The boat of claim 1, wherein the starboard and port worm drives are controlled by mechanical means.

11. The boat of claim 1, wherein the first and second portions of the starboard and port wake shaping plates are constructed from stainless steel.

12. The boat of claim 1, wherein the first and second portions of the starboard and port wake shaping plates are constructed from fiberglass.

13. The boat of claim 1, wherein the starboard and port wake shaping devices do not provide lift to the transom and do not list the hull in either the first, non-deployed positions or the second, deployed positions.

14. A wake shaping system for wakeboarding and wakesurfing, the wake shaping system comprising:
   starboard and port wake shaping devices operable to be coupled to a transom of a boat;
   wherein each wake shaping device is operable to independently move between a first, non-deployed position and a second, deployed position;
   wherein in the first, non-deployed positions, each wake shaping device does not extend outside or below the transom of the boat;
   wherein in the second, deployed positions, at least a portion of each wake shaping device is operable to extend outside or below the transom of the boat;
   wherein when the starboard wake shaping device is in the deployed position, a port wakesurf wake is operable to be created behind the boat;
   wherein when the port wake shaping device is in the deployed position, a starboard wakesurf wake is operable to be created behind the boat; and
   wherein starboard and port worm drives are operable to move the starboard and port wake shaping devices between the first, non-deployed positions and the second, deployed positions.

15. The wake shaping system of claim 14, wherein each wake shaping device comprises a first mounting portion operable to be coupled to the transom and a second plate portion pivotably coupled to the first mounting portion, and wherein the first mounting portions of the first and second wake shaping devices are operable to be mounted directly to the transom at the starboard and port first mounting portions.

16. The wake shaping system of claim 15, wherein the first mounting portions of the first and second wake shaping devices are operable to be mounted directly to the transom slightly away from the starboard and port sides of the hull and above the lower edge of the transom.

17. The wake shaping system of claim 15, wherein the second plate portion of the starboard wake shaping device pivots relative to the first mounting portion of the starboard wake shaping device along a starboard pivot axis.

18. The wake shaping system of claim 17, wherein when the starboard wake shaping device is mounted to the transom, the starboard pivot axis is operable to be angled along the transom from a centerline of the boat to a starboard side of the boat at approximately 40° above a lateral axis.

19. The wake shaping system of claim 15, wherein the second plate portion of the port wake shaping plate device pivots relative to the first mounting portion of the port wake shaping device along a port pivot axis.

20. The wake shaping system of claim 19, wherein when the port wake shaping device is mounted to the transom, the port pivot axis is operable to be angled along the transom from a centerline of the boat to a port side of the boat at approximately 40° above a lateral axis.

21. The wake shaping system of claim 15, wherein when the second plate portion of the starboard wake shaping device is in the second, deployed position, the second portion is operable to extend between approximately 2" and 3" beyond a starboard side of the boat and is operable to extend between approximately 2" and 3" beyond a lower edge of the transom.

22. The wake shaping system of claim 15, wherein when the second plate portion of the port wake shaping device is in the second, deployed position, the second portion is operable to extend between approximately 2" and 3" beyond a port side of the boat and is operable to extend between approximately 2" and 3" beyond a lower edge of the transom.

23. The wake shaping system of claim 15, wherein the starboard and port worm drives are operable to be controlled by an electronic device.

24. The wake shaping system of claim 15, wherein the starboard and port worm drives are operable to be controlled by mechanical means.

25. The wake shaping system of claim 15, wherein the first and second portions of the starboard and port wake shaping devices are constructed from stainless steel or fiberglass.

26. The wake shaping system of claim 15, wherein the starboard and port worms drives are actuators or comprise at least one actuator.

27. The wake shaping system of claim 15, wherein the starboard and port wake shaping devices do not provide lift to the transom of boat and do not list the boat in either the first, non-deployed positions or the second, deployed positions.

28. The wake shaping system of claim 15, wherein when the starboard and port wake shaping devices are both in their respective first, non-deployed positions, a symmetrical wakeboard wake is operable to be created behind the boat.

29. The boat of claim 1, wherein the starboard and port worm drives are actuators or comprise at least one actuator.

30. The boat of claim 1, wherein the starboard and port fishing mounting portions comprise at least one aperture.

* * * * *

UNITED STATES PATENT AND TRADEMARK OFFICE
CERTIFICATE OF CORRECTION

PATENT NO. : 9,796,451 B2  
APPLICATION NO. : 14/874141  
DATED : October 24, 2017  
INVENTOR(S) : Michael Hardy Brendel Page 1 of 1

It is certified that error appears in the above-identified patent and that said Letters Patent is hereby corrected as shown below:

In the Claims

In Column 14, Claim 1, Line 21, please remove the "s" in "devices."

In Column 16, Claim 30, Line 55, please replace "fishing" with "first."

Signed and Sealed this
Fifth Day of December, 2017

Joseph Matal
*Performing the Functions and Duties of the
Under Secretary of Commerce for Intellectual Property and
Director of the United States Patent and Trademark Office*